United States Patent
Jeong et al.

(10) Patent No.: US 7,990,815 B2
(45) Date of Patent: Aug. 2, 2011

(54) OPTICAL DISC APPARATUS AND METHOD OF DRIVING THE SAME

(75) Inventors: An-sik Jeong, Hwaseong-si (KR); Joon Jeong, Suwon-si (KR); Joong-gon Kim, Govang-si (KR); Hyun-seok Yang, Seoul (KR); Chong-sam Chung, Hwaseong-si (KR); Noh-cheol Park, Seoul (KR); Kyung-geun Lee, Seongnam-si (KR); Jin-kyung Lee, Suwon-si (KR); Jong-hyun Shin, Suwon-si (KR)

(73) Assignees: Samsung Electronics Co., Ltd., Suwon-si (KR); Industry-Academic Foundation Yonsei University, Seoul (KR)

( * ) Notice: Subject to any disclaimer, the term of this patent is extended or adjusted under 35 U.S.C. 154(b) by 350 days.

(21) Appl. No.: 12/036,474

(22) Filed: Feb. 25, 2008

(65) Prior Publication Data

US 2009/0059752 A1  Mar. 5, 2009

(30) Foreign Application Priority Data

Sep. 5, 2007 (KR) .................. 10-2007-0089969

(51) Int. Cl.
*G11B 7/00* (2006.01)
(52) U.S. Cl. .................. 369/44.25; 369/112.24
(58) Field of Classification Search .................. None
See application file for complete search history.

(56) References Cited

U.S. PATENT DOCUMENTS

| 2002/0048236 A1* | 4/2002 | Tada et al. .................. 369/44.27 |
| 2003/0067850 A1 | 4/2003 | Takahashi et al. |
| 2005/0180283 A1* | 8/2005 | Ishimoto et al. .......... 369/53.19 |
| 2006/0187773 A1 | 8/2006 | Ishimoto |

FOREIGN PATENT DOCUMENTS

| JP | 2004-220743 | 8/2004 |
| WO | WO 2005/101391 | 10/2005 |

OTHER PUBLICATIONS

International Search Report dated Jun. 11, 2008 of the PCT Application No. PCT/KR2008/001177.

* cited by examiner

*Primary Examiner* — Joseph Haley
(74) *Attorney, Agent, or Firm* — NSIP Law

(57) ABSTRACT

An optical disc apparatus, and a method of driving the same, includes a light focusing element disposed to focus light emitted from a light source onto a disc; an actuator to move the light focusing element toward or away from the disc according to a voltage applied to the actuator; a light intensity detection unit to detect the intensity of light reflected from the disc; a servo unit to generate a gap error signal and a third voltage, the third voltage being the sum of a first voltage and a second voltage, and to apply the generated third voltage to the actuator; and a control unit to control the servo unit to perform a gap pull-in operation when the light focusing element is moved toward the disc according to the gap error signal and the third voltage.

8 Claims, 5 Drawing Sheets

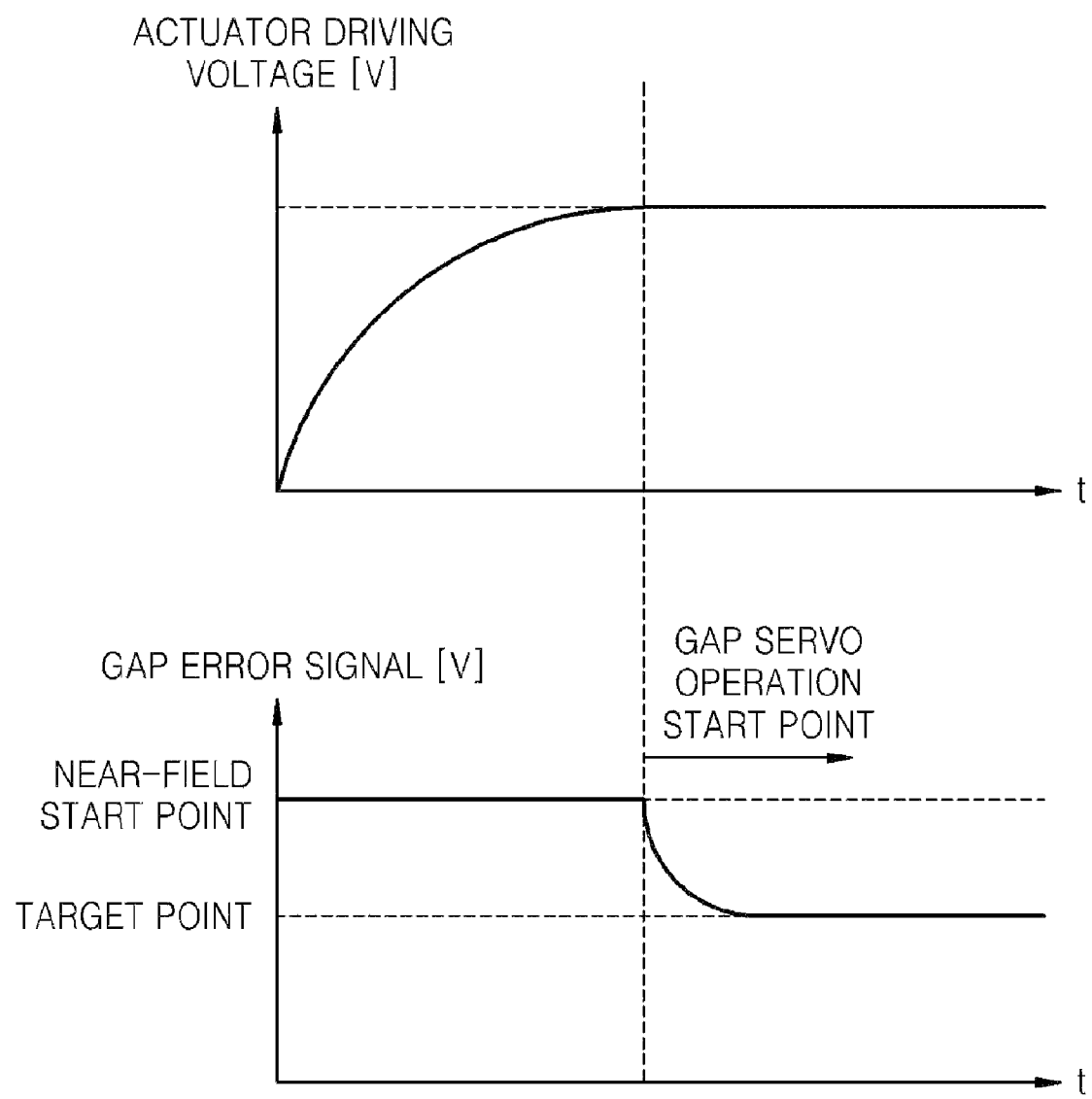

OPTICAL DISC APPARATUS AND METHOD OF DRIVING THE SAME

CROSS-REFERENCE TO RELATED APPLICATIONS

This application claims the benefit of Korean Patent Application No. 2007-89969, filed on Sep. 5, 2007, in the Korean Intellectual Property Office, the disclosure of which is incorporated herein by reference.

BACKGROUND OF THE INVENTION

1. Field of the Invention

Aspects of the present invention relate to an optical disc apparatus and a method of driving the same, and more particularly, to a near-field optical disc apparatus and a method of driving the same to prevent a light focusing element and a disc from colliding with each other due to overshoot generated in a gap pull-in method, and to provide fast loading of the disc as an actuator approaches a near-field.

2. Description of the Related Art

Recently, a near-field optical disc apparatus that achieves a large storage capacity and a high Data Transfer Rate (DTR) has been proposed. The near-field optical disc apparatus is also known as a near-field recording system. The near-field optical disc apparatus records and/or reproduces data in a disc by using light in a near-field in which the light is not diffracted. Thus, the near-field optical disc apparatus has to control a gap distance between the end surface of a Solid Immersion Lens (SIL) attached to a light focusing element, such as an object lens, and an optical disk such that the gap distance becomes very small (for example, several nanometers).

A near-field optical system based on the SIL has to follow a disturbance of a disc within a range of a near-field, and thus, cannot use a focusing servo method which is used in a conventional far-field optical disc drive. Hence, the near-field optical system uses a mode switching pull-in method. The mode switching pull-in method has three stages, which are an approach stage, a handover stage, and a gap servo stage. In the approach stage, a linear output voltage is applied to an actuator by an open loop to move the actuator toward a near-field area in which a sensing operation can be performed. The actuator approaches a disc as the actuator moves toward and through the near-field area. In the handover stage, a speed of the actuator is controlled by a regular input to move the actuator toward and/or to a target location so as to prevent collision with the disc. In the gap servo stage, a disturbance of the disc is performed at the target location. The gap servo stage corresponds to a focusing servo stage in the conventional far-field optical disc drive.

However, the mode switching pull-in method may overshoot the target location, which causes collisions between the SIL and the disc, and requires determining/obtaining information on a location of the disc for loading the disc, which takes time.

SUMMARY OF THE INVENTION

Aspects of the present invention provide an optical disc apparatus and a method of driving the same to solve a delayed-loading problem due to overshoot which causes collisions with a disc and the time taken to determine/obtain information on a location of the disc.

According to an aspect of the present invention, there is provided an optical disc apparatus including a light focusing element disposed to face a disc and to focus light emitted from a light source onto the disc; an actuator to move the light focusing element toward or away from the disc according to a voltage applied to the actuator; a light intensity detection unit to detect the intensity of light fed back via the light focusing element; a servo unit to generate a gap error signal and a third voltage, the third voltage being the sum of a first voltage and a second voltage, and to apply the generated third voltage to the actuator; and a control unit to control the servo unit to perform a gap pull-in operation when the light focusing element is moved toward the disc according to the gap error signal and the third voltage.

According to aspects of the current invention, the servo unit may include a first voltage generation unit to generate the first voltage; a second voltage generation unit to generate the second voltage; and an adder to add the first voltage and the second voltage.

According to aspects of the current invention, the first voltage may linearly increase and the second voltage may converge to a predetermined value.

According to aspects of the current invention, the first voltage may be a ramp voltage and the second voltage may be a step voltage after being low-pass filtered.

According to aspects of the current invention, the slope of the ramp voltage may be changeable.

According to aspects of the current invention, the light focusing element may include a Solid Immersion Lens (SIL).

According to another aspect of the present invention, there is provided a gap pull-in method for an optical disc apparatus, the gap pull-in method includes generating a first and second voltage, generating a third voltage that is a sum of the first voltage and the second voltage; applying the generated third voltage to an actuator to move a light focusing element toward or away from a disc; moving the light focusing element toward the disc according to the applied third voltage to focus light emitted from a light source, the light emitted from the light source being reflected by the disc; and starting a gap servo operation when the light focusing element reaches a target point, the target point being within a near-field region of the light reflected from the disc.

Additional aspects and/or advantages of the invention will be set forth in part in the description which follows and, in part, will be obvious from the description, or may be learned by practice of the invention.

BRIEF DESCRIPTION OF THE DRAWINGS

The above and/or other features and advantages of the present invention will become more apparent by describing in detail exemplary embodiments thereof with reference to the attached drawings in which:

FIG. 5 is a graph illustrating a gap pull-in method, according to an embodiment of the present invention.

DETAILED DESCRIPTION OF THE EMBODIMENTS

Figure 1:
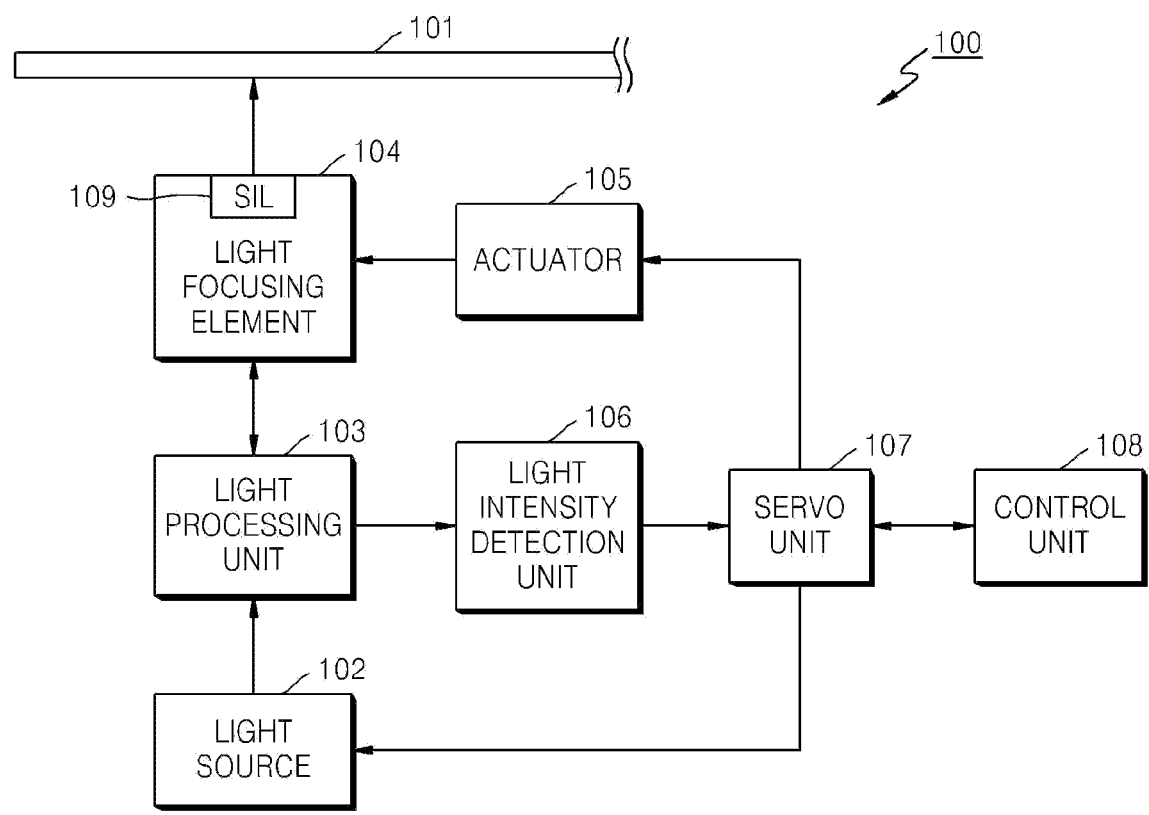
FIG. 1 is a block diagram illustrating a configuration of a near-field optical disc apparatus according to an embodiment of the present invention.

Reference will now be made in detail to the present embodiments of the present invention, examples of which are illustrated in the accompanying drawings, wherein like reference numerals refer to the like elements throughout. The embodiments are described below in order to explain the aspects of the present invention by referring to the figures.

FIG. 1 is a block diagram illustrating a configuration of a near-field optical disc apparatus 100 according to an embodiment of the present invention. Referring to FIG. 1, the near-field optical disc apparatus 100 includes a light source 102, a light processing unit 103, a light focusing element 104, an actuator 105, a light intensity detection unit 106, a servo unit 107, and a control unit 108. The light focusing element 104 includes a Solid Immersion Lens (SIL) 109.

The light source 102 may be a laser diode. The light source 102 emits light when powered on by the servo unit 107.

The light processing unit 103 transfers the light emitted from the light source 102 to the light focusing element 104, and transfers light fed back from the light focusing element 104 to the light intensity detection unit 106. In order to perform this operation, the light processing unit 103 may include a collimator lens, an anamorphic prism, a beam splitter, a wave plate, an achromatic lens, a magnification lens, a Wollaston prism, a light focusing lens, and the like. However, the light processing unit 103 is not limited thereto such that the light processing unit 103 may transfer a portion of the light emitted from the light source 102 directly to the light intensity detection unit 106 without being reflected by a disc 101.

The light focusing element 104 faces the disc 101 and includes the SIL 109. The light focusing element 104 focuses light input thereto via the light processing unit 103 onto the disc 101 as near-field light so as to record data on the disc 101 or to read data recorded on the disc 101. The light focusing element 104 receives light reflected or diffracted by the disc 101 via the SIL 109, and the light focusing element 104 transmits the light to the light processing unit 103.

The actuator 105 is moved up and down when a driving voltage is applied thereto to move the light focusing element 104 vertically upwards toward the disc 101 or to move the light focusing element 104 downwards from the disc 101. Thus, the light focusing element 104 approaches the disc 101 when the actuator 105 vertically ascends, and the light focusing element 104 becomes distant from the disc 101 when the actuator 105 vertically descends. However, aspects of the present invention are not limited thereto such that the light focusing element 104 may approach the disc 101 when the actuator 105 vertically descends, and the light focusing element 104 may become distant from the disc 101 when the actuator 105 vertically ascends. Further, the actuator 105 need not move up and down when the driving voltage is applied thereto, but the actuator 105 may instead operate to move the light focusing element 104 toward or away from the disc, i.e., the actuator 105 may move side to side or remain stationary and control the movement of the light focusing element 104 via control signals, or a combination thereof.

The light intensity detection unit 106 detects the intensity of light input thereto in order to generate a gap error signal when reflected or diffracted light is input from the light processing unit 103. At this time, the detected intensity of light may correspond to the intensity of total-reflection feedback light. The detected intensity of light is transmitted to the servo unit 107. The light detection unit 106 may be configured in the form of a photo-detector.

Figure 2:
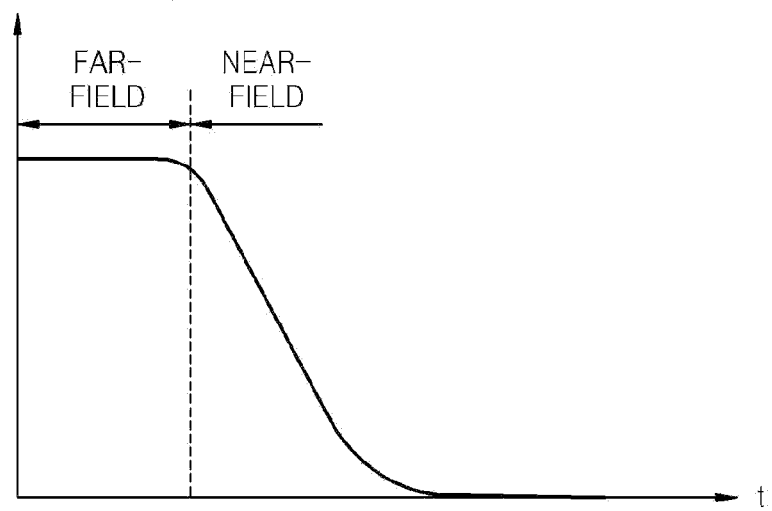
FIG. 2 illustrates an example of a gap error signal generated when the actuator of FIG. 1 ascends.

The servo unit 107 generates a gap error signal and an actuator driving voltage according to the intensity of feedback light received from the light detection unit 106. The servo unit 107 provides the generated actuator driving voltage to each of the actuator 105 and the control unit 108. The servo unit 107 provides the gap error signal to the control unit 108. The servo unit 107 generates a sum voltage of an exponential voltage and a ramp voltage. The sum voltage is applied to the actuator 105 as the actuator driving voltage. The voltage is not limited to the exponential voltage or the ramp voltage. The actuator driving voltage can be the sum of a plurality of voltage. The gap error signal generated by the servo unit 107 approaches zero as the SIL 109 included in the light focusing element 104 approaches the disc 101, as illustrated in FIG. 2. That is, the gap error signal maintains a uniform level in a far-field, as illustrated in FIG. 2. The level of the gap error signal decreases in a near-field state in which the SIL 109 approaches the disc 101. When the SIL 109 comes into contact with the disc 101, the level of the gap error signal becomes zero. This is because the disk 101 absorbs parts of the light input from the SIL 109, and thus the intensity of feedback light reflected from the disc 101 is reduced when the SIL 109 comes into contact with the disc 101. Accordingly, the servo unit 107 may drive the actuator 105 so that the gap error signal approaches zero in the near-field. FIG. 2 illustrates an example of the gap error signal generated when the light focusing element 104 approaches the disc 101.

Figure 3:
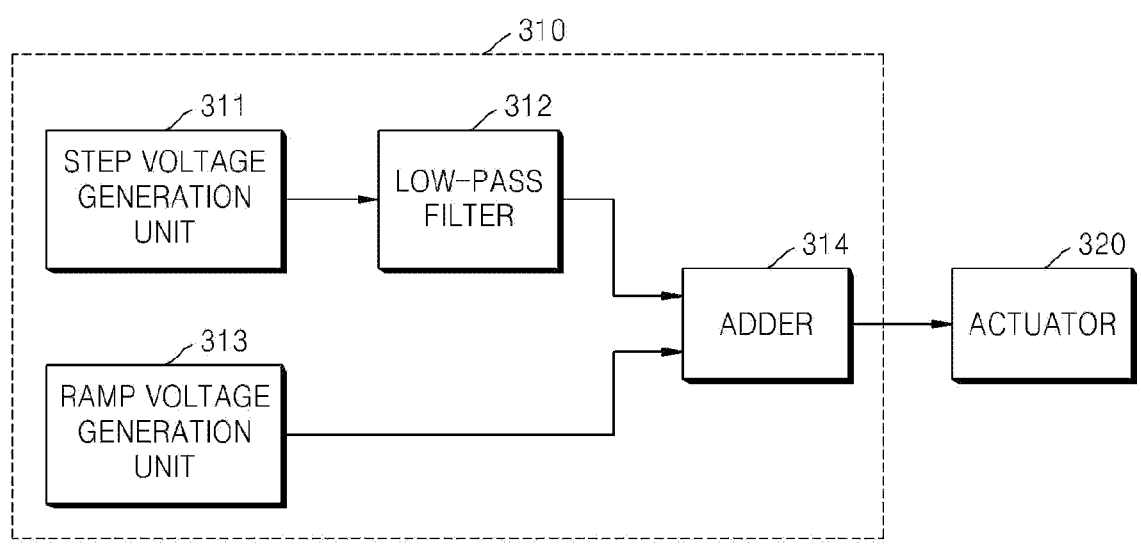
FIG. 3 is a block diagram illustrating a servo unit and an actuator according to another embodiment of the present invention.

FIG. 3 is a block diagram illustrating a servo unit 310 and an actuator 320 according to another embodiment of the present invention. Referring to FIG. 3, the servo unit 310 includes a step voltage generation unit 311, a low-pass filter 312, a ramp voltage generation unit 313, and an adder 314.

Figure 4A:
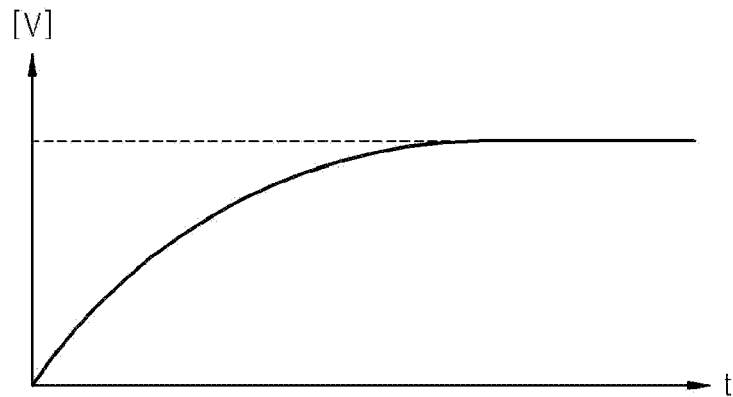
FIGS. 4A through 4C are graphs illustrating a driving voltage that is applied to an actuator, according to another embodiment of the present invention.
Figure 4B:
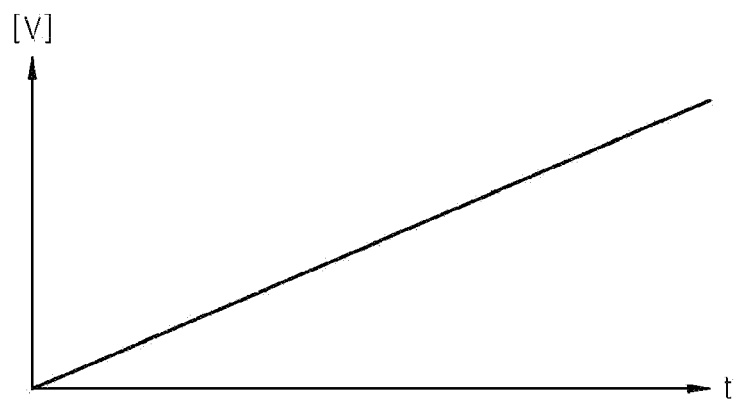

The step voltage generation unit 311 generates a step voltage (not shown), and the step voltage generation unit 311 inputs the step voltage to the low-pass filter 312. A step voltage after being low-pass filtered is illustrated in FIG. 4A. This step voltage becomes the exponential voltage that exponentially increases and converges to a predetermined value. The ramp voltage generation unit 313 generates a ramp voltage that linearly increases as illustrated in FIG. 4B.

Figure 4C:
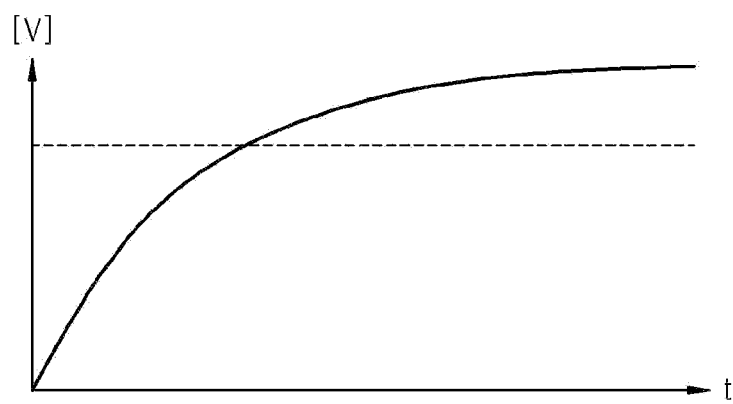

The adder 314 adds the generated exponential voltage and the generated ramp voltage. As illustrated in FIG. 4C, the added voltage exponentially increases, and after a predetermined lapse of time, linearly increases without convergence. The voltage added by the adder 314 is applied to the actuator 320. Also, to the servo unit 310 may control a speed of the actuator 105, 320, or the speed with which the actuator 105, 320 controls the movement of the light focusing element, when approaching the near-field by changing a slope of the generated ramp voltage.

The control unit 108 controls the servo unit 107 to perform a gap servo operation in a period in which the actuator 105, 320 operates to move the light focusing element 104 toward the disc, and specifically when the actuator 105, 320 operates to move the light focusing element 104 toward the disc in the near-field region. That is, the control unit 108 controls the servo unit 107 to apply a voltage to the actuator 105, 320, which operates to move the SIL 109 toward the disc 101. Accordingly, the servo unit 107 powers on the light source 102 and transmits the gap error signal detected based on the intensity of feedback light received from the light intensity detection unit 106 and the actuator driving voltage to the control unit 108. The control unit 108 starts the gap servo operation when the light focusing element 104 reaches a target point below the point at which the near-field starts, i.e., the target point is within a near-field region.

FIG. 5 is a graph illustrating a gap pull-in method according to an embodiment of the present invention. Referring to FIG. 5, a voltage, which is the sum of the low-pass filtered step voltage and the ramp voltage, both of which are generated by the servo unit 107, is applied to the actuator 105, 320 so as to move the actuator 105, 320 upwards so that the gap servo operation is started at the target point within the near-field region. However, the actuator 105, 320 may be moved downwards toward the disc 101 or the actuator 105, 320 may be controlled to apply a control signal to the light focusing element 104 to move the light focusing element 104 according to different aspects of the present invention.

Figure 6:
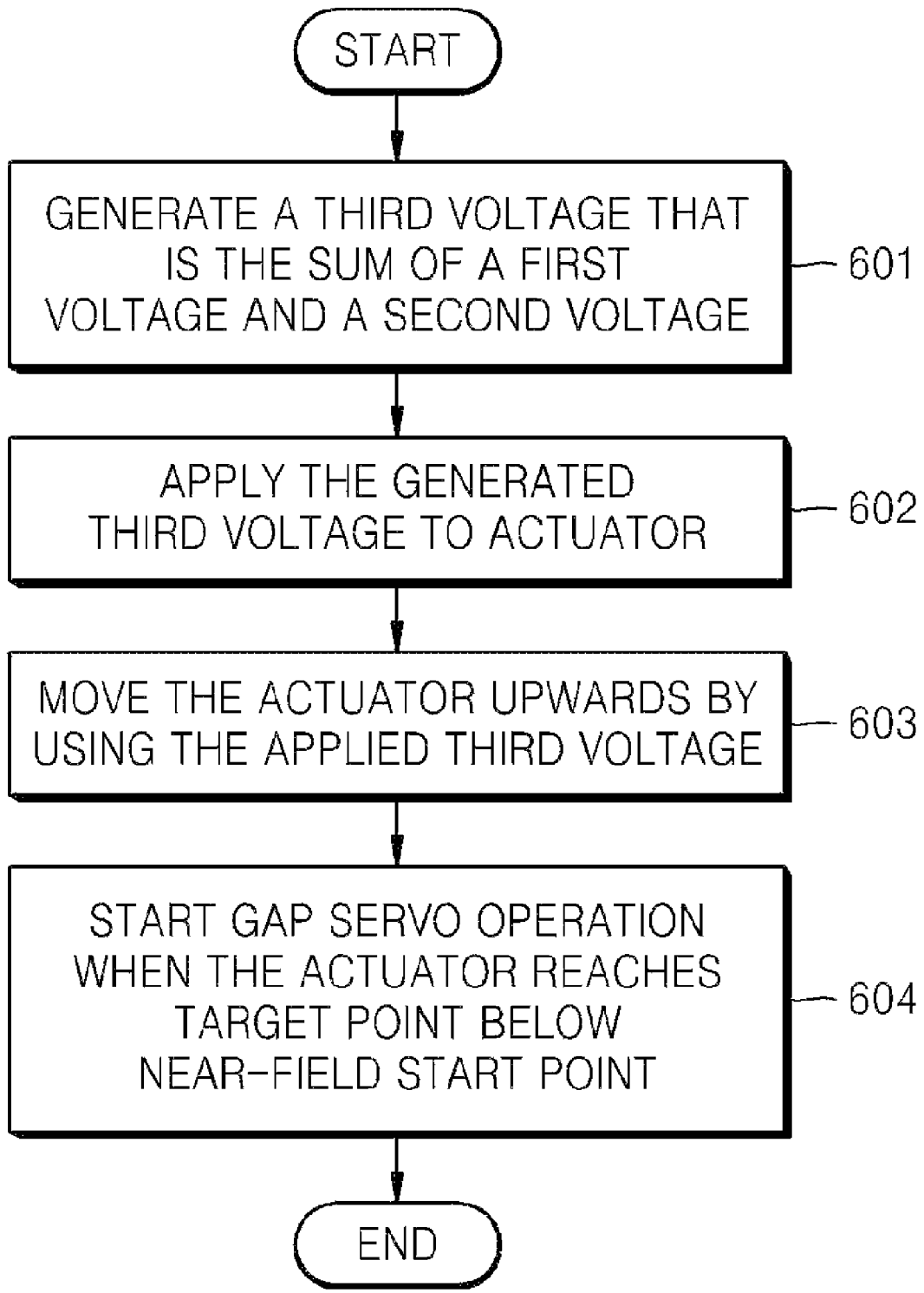
FIG. 6 is a flowchart of a gap pull-in method, according to an embodiment of the present invention.

FIG. 6 is a flowchart of a gap pull-in method, according to an embodiment of the present invention. The flowchart of FIG. 6 will now be described with reference to FIG. 1. In operation 601, the servo unit 107 generates a third voltage that is the sum of a first voltage and a second voltage. The first voltage corresponds to the exponential voltage that increases and converges to the predetermined value. The second voltage corresponds to the ramp voltage that linearly increases. The third voltage exponentially increases and after a predetermined lapse of time, linearly increases.

In operation 602, the generated third voltage is applied to an actuator 105, 320 as a driving voltage. In operation 603, the actuator 105, 320 is moved upwards toward the disc 101 by using the applied third voltage. However, according to other aspects of the present invention, the actuator 105, 320 may be moved downwards toward the disc 101 or the actuator 105, 320 may be controlled to apply a control signal to the light focusing element 104 to move the light focusing element 104. In operation 604, when the actuator 105, 320 reaches a target point below a near-field start point, the gap servo operation is started.

As described above, in the near-field optical disc apparatus according to aspects of the present invention, the actuator searches for a near-field area while continuously moving toward the disc, or while controlling the light focusing element to continuously move toward the disc, without having to determine/obtain information on the location of the disc, thereby searching for a point of entry to the near-field from the far-field. Also, since a moving speed of the actuator, or the speed with which the actuator causes the light focusing element to move, at the point at which the near-field is detected is decreased, overshoot generated in a gap pull-in operation can be reduced. Such reduction of the overshoot can prevent the disc and the SIL from colliding and can reduce the pull-in time since there is no need to determine/obtain information on the location of the disc.

Aspects of the present invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, and optical data storage devices. The computer readable recording medium can also be distributed over network coupled computer systems so that the computer readable code is stored and executed in a distribution fashion.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An optical disc apparatus, comprising:
    a light focusing element disposed to focus light emitted from a light source onto a disc;
    an actuator to move the light focusing element toward or away from the disc according to a voltage applied to the actuator;
    a light intensity detection unit to detect the intensity of light reflected from the disc via the light focusing element;
    a servo unit to generate a gap error signal and a third voltage unrelated to the gap error signal, the third voltage being the sum of a first voltage and a second voltage, and to apply the generated third voltage to the actuator; and
    a control unit to control the servo unit to perform a gap pull-in operation when the light focusing element is moved toward the disc according to the gap error signal and the third voltage;
    wherein the first voltage linearly increases and the second voltage converges to a predetermined value.

2. The optical disc apparatus of claim 1, wherein the servo unit comprises:
    a first voltage generation unit to generate the first voltage;
    a second voltage generation unit to generate the second voltage; and
    an adder to add the first voltage and the second voltage.

3. The optical disc apparatus of claim 1, wherein the first voltage is a ramp voltage and the second voltage is a low-pass filtered step voltage.

4. The optical disc apparatus of claim 3, wherein a slope of the ramp voltage is changeable.

5. The optical disc apparatus of claim 1, wherein the light focusing element comprises a solid immersion lens.

6. A gap pull-in method for an optical disc apparatus, the gap pull-in method comprising:
    generating a first voltage and a second voltage;
    generating a third voltage that is a sum of the first voltage and the second voltage and unrelated to a gap error signal;
    applying the generated third voltage to an actuator to move a light focusing element toward or away from the disc;
    moving the light focusing element toward the disc according to the applied third voltage to focus light emitted from a light source; and
    starting a gap servo operation when the light focusing element reaches a target point, the target point being within a near-field region of the light reflected from the disc;
    wherein the first voltage linearly increases and the second voltage converges to a predetermined value.

7. The gap pull-in method of claim 6, wherein the first voltage is a ramp voltage and the second voltage is a low-pass filtered step voltage.

8. The gap pull-in method of claim 7, wherein a slope of the ramp voltage is changeable.

* * * * *